US010021840B2

(12) United States Patent
Stout

(10) Patent No.: US 10,021,840 B2
(45) Date of Patent: Jul. 17, 2018

(54) AUTOMATED TREE CUTTING ASSEMBLY

(71) Applicant: Steve Stout, Alsea, OR (US)

(72) Inventor: Steve Stout, Alsea, OR (US)

( * ) Notice: Subject to any disclaimer, the term of this patent is extended or adjusted under 35 U.S.C. 154(b) by 181 days.

(21) Appl. No.: 15/049,204

(22) Filed: Feb. 22, 2016

(65) Prior Publication Data

US 2017/0238481 A1 Aug. 24, 2017

(51) Int. Cl.
*A01G 23/095* (2006.01)
(52) U.S. Cl.
CPC ................. *A01G 23/0955* (2013.01)
(58) Field of Classification Search
CPC .................................................. A01G 23/0955
See application file for complete search history.

(56) References Cited

U.S. PATENT DOCUMENTS

| 3,454,058 A | 8/1966 | Fend |
| 4,279,281 A | 7/1981 | Nakamura |
| 6,474,377 B1 | 11/2002 | Van De Mortel |
| D575,605 S | 8/2008 | Yamamoto et al. |
| 7,487,809 B2* | 2/2009 | Uebergang ......... A01G 23/0955 144/208.1 |
| 7,997,311 B2* | 8/2011 | Prout, Jr. ........... A01G 23/0955 144/208.2 |
| 8,307,865 B1 | 11/2012 | Cuffel |
| 8,517,066 B1* | 8/2013 | Van De Mortel ......... B27L 1/06 144/24.13 |
| 2007/0181217 A1* | 8/2007 | Ahdoot .............. A01G 23/0955 144/208.2 |
| 2009/0277536 A1* | 11/2009 | Scott .................. A01G 23/0955 144/24.13 |

\* cited by examiner

*Primary Examiner* — Matthew G Katcoff

(57) ABSTRACT

An automated tree cutting assembly includes a collar that may be positioned around a tree. A plurality of climbing units is movably coupled to the collar. The climbing units frictionally engage the tree thereby facilitating each of the climbing units to urge the collar around and up the tree. Each of the climbing units is positionable at selected angle with respect to the collar. Thus, each of the climbing unit units may urge the collar to travel in a spiral along the tree thereby facilitating the collar to climb upwardly and downwardly along the tree. A cutting unit is movably coupled to the collar to cut branches from the tree when the collar is positioned around the tree.

13 Claims, 7 Drawing Sheets

AUTOMATED TREE CUTTING ASSEMBLY

BACKGROUND OF THE DISCLOSURE

Field of the Disclosure

The disclosure relates to cutting devices and more particularly pertains to a new cutting device for remotely trimming branches from a tree.

SUMMARY OF THE DISCLOSURE

An embodiment of the disclosure meets the needs presented above by generally comprising a collar that may be positioned around a tree. A plurality of climbing units is movably coupled to the collar. The climbing units frictionally engage the tree thereby facilitating each of the climbing units to urge the collar around and up the tree. Each of the climbing units is positionable at selected angle with respect to the collar. Thus, each of the climbing unit units may urge the collar to travel in a spiral along the tree thereby facilitating the collar to climb upwardly and downwardly along the tree. A cutting unit is movably coupled to the collar to cut branches from the tree when the collar is positioned around the tree.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
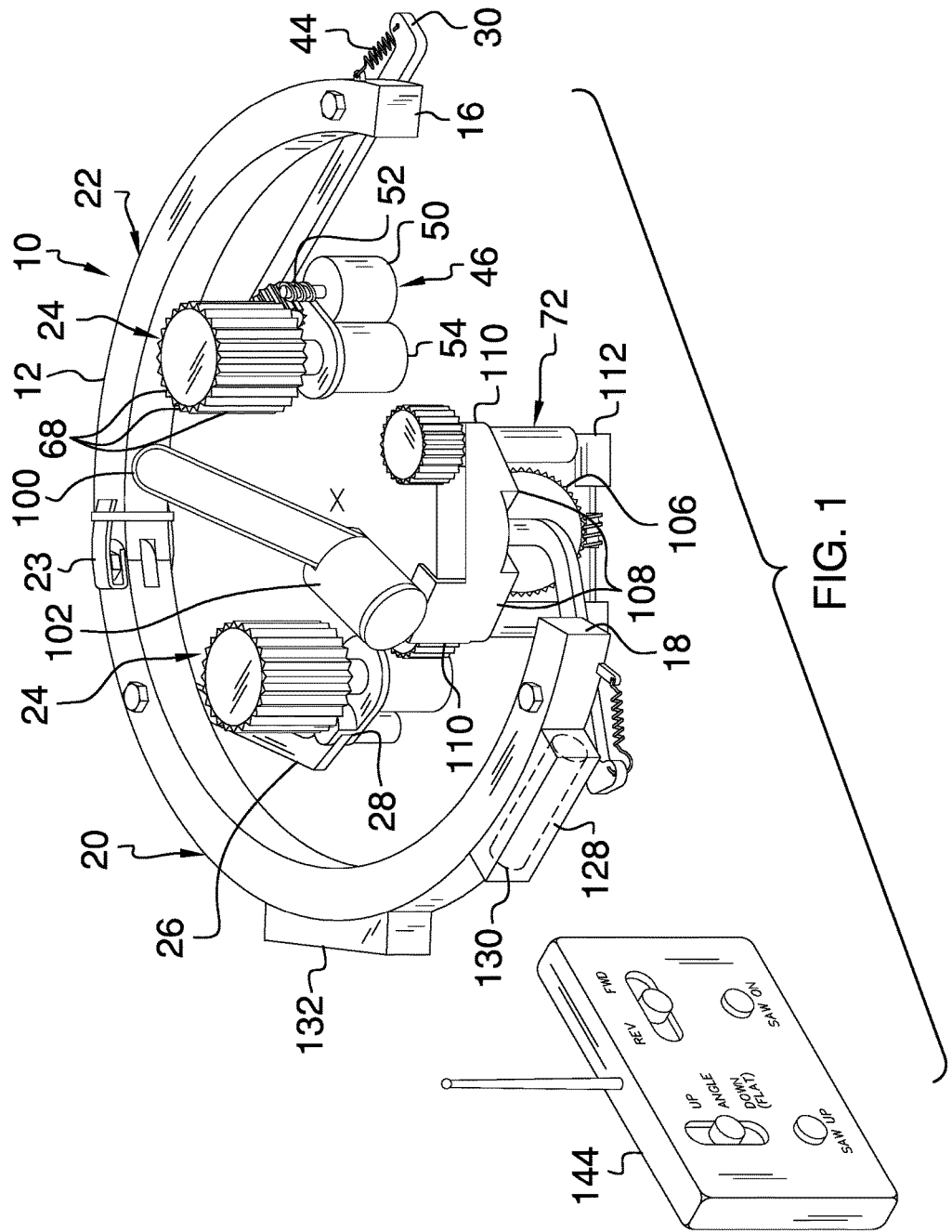
FIG. 1 is a perspective view of an automated tree cutting assembly according to an embodiment of the disclosure.
Figure 2:
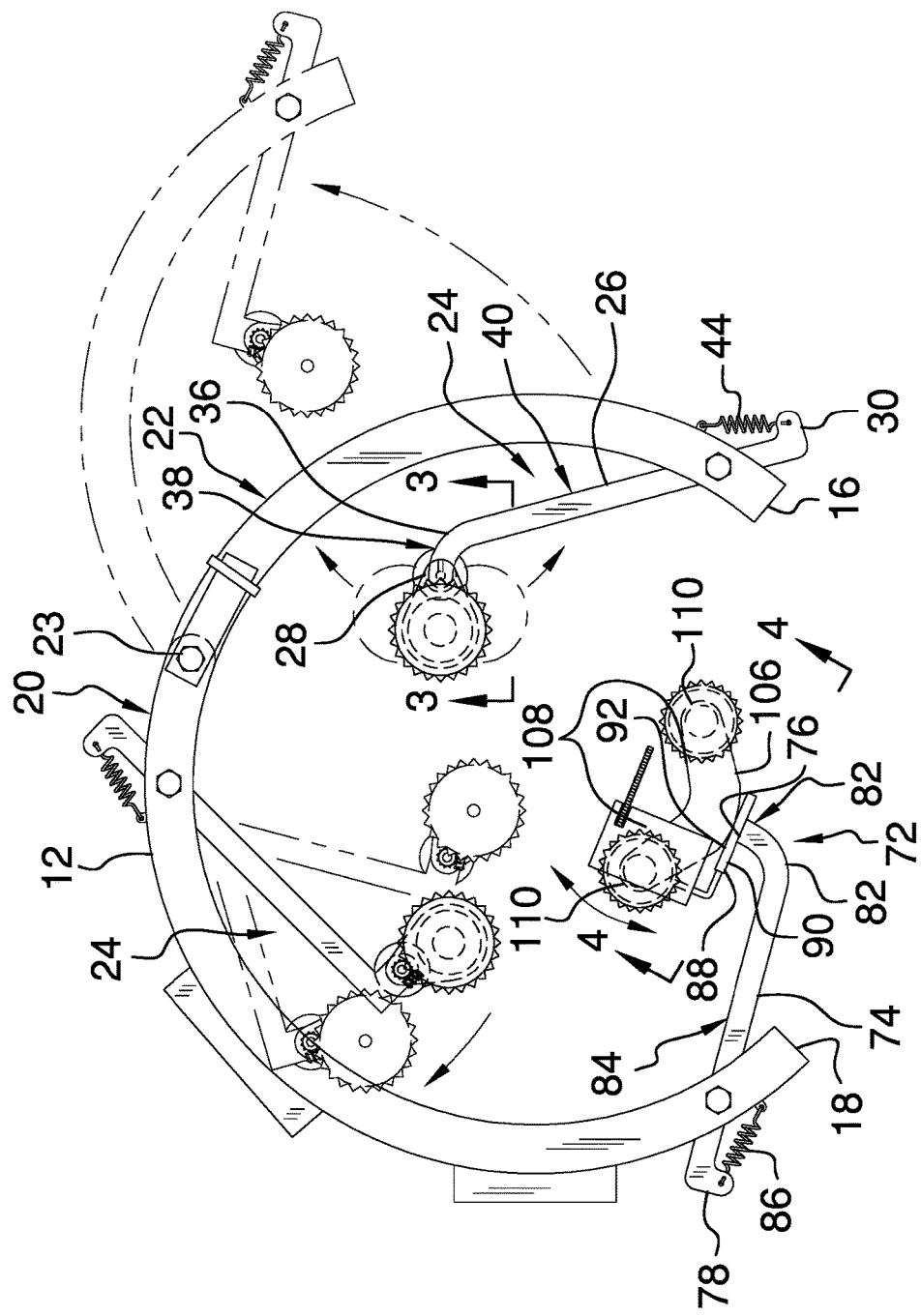
FIG. 2 is a top view of an embodiment of the disclosure.
Figure 3:
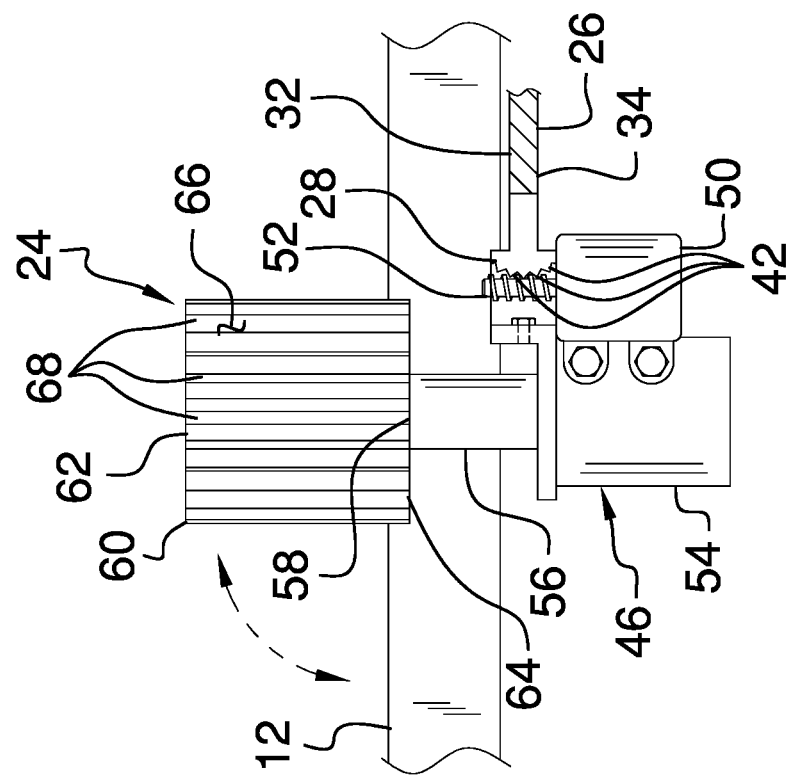
FIG. 3 is a cross sectional view taken along line 3-3 if FIG. 2 of an embodiment of the disclosure.
Figure 4:
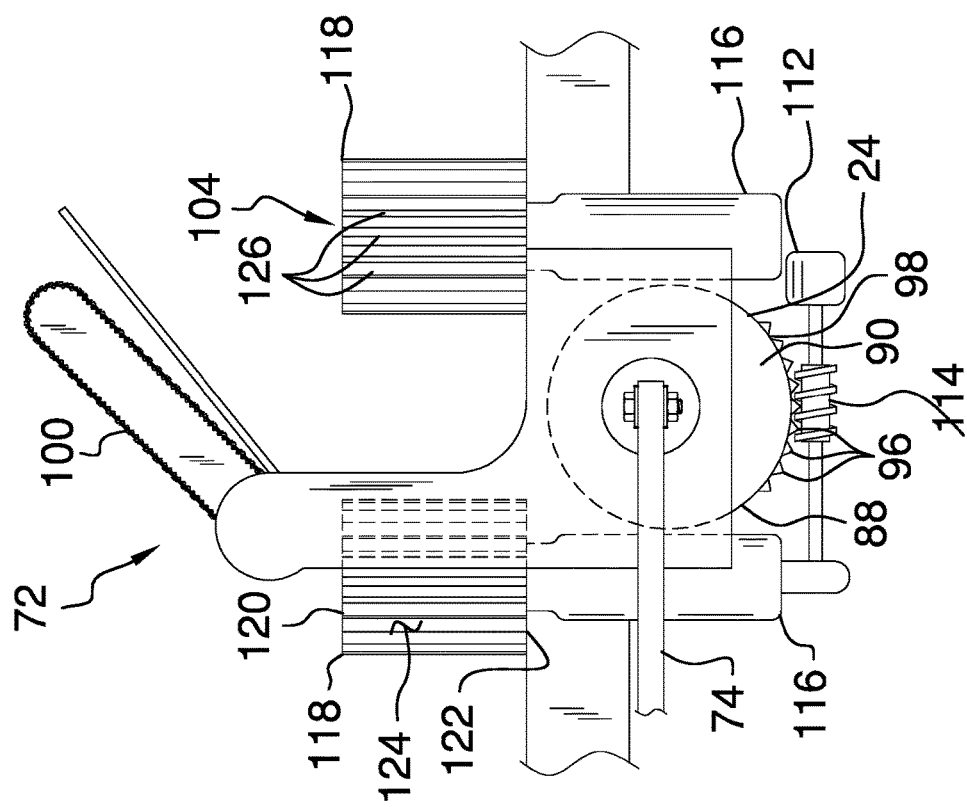
FIG. 4 is a cross sectional view taken along line 4-4 of FIG. 2 of an embodiment of the disclosure.
Figure 5:
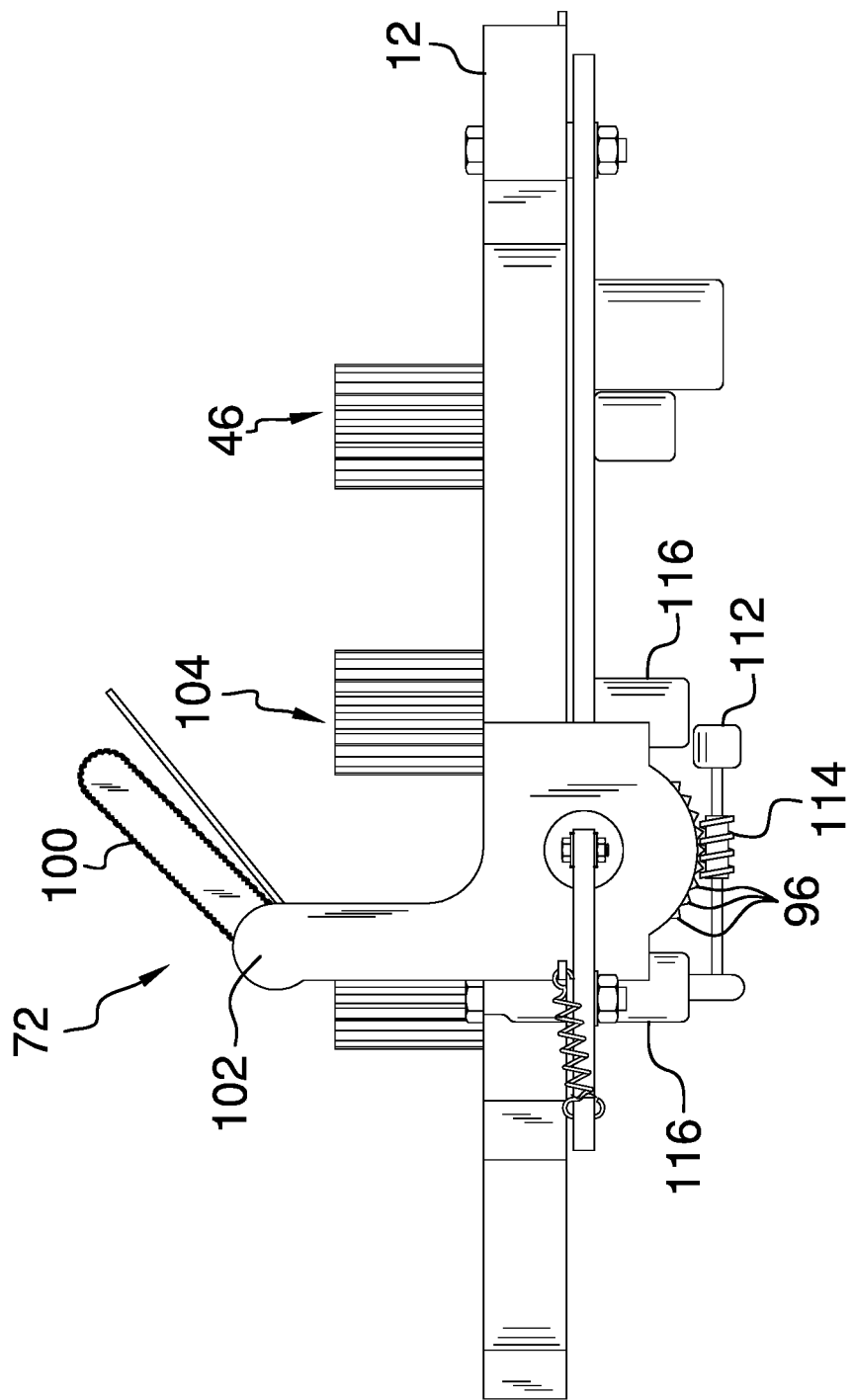
FIG. 5 is a front view of an embodiment of the disclosure.
Figure 6:
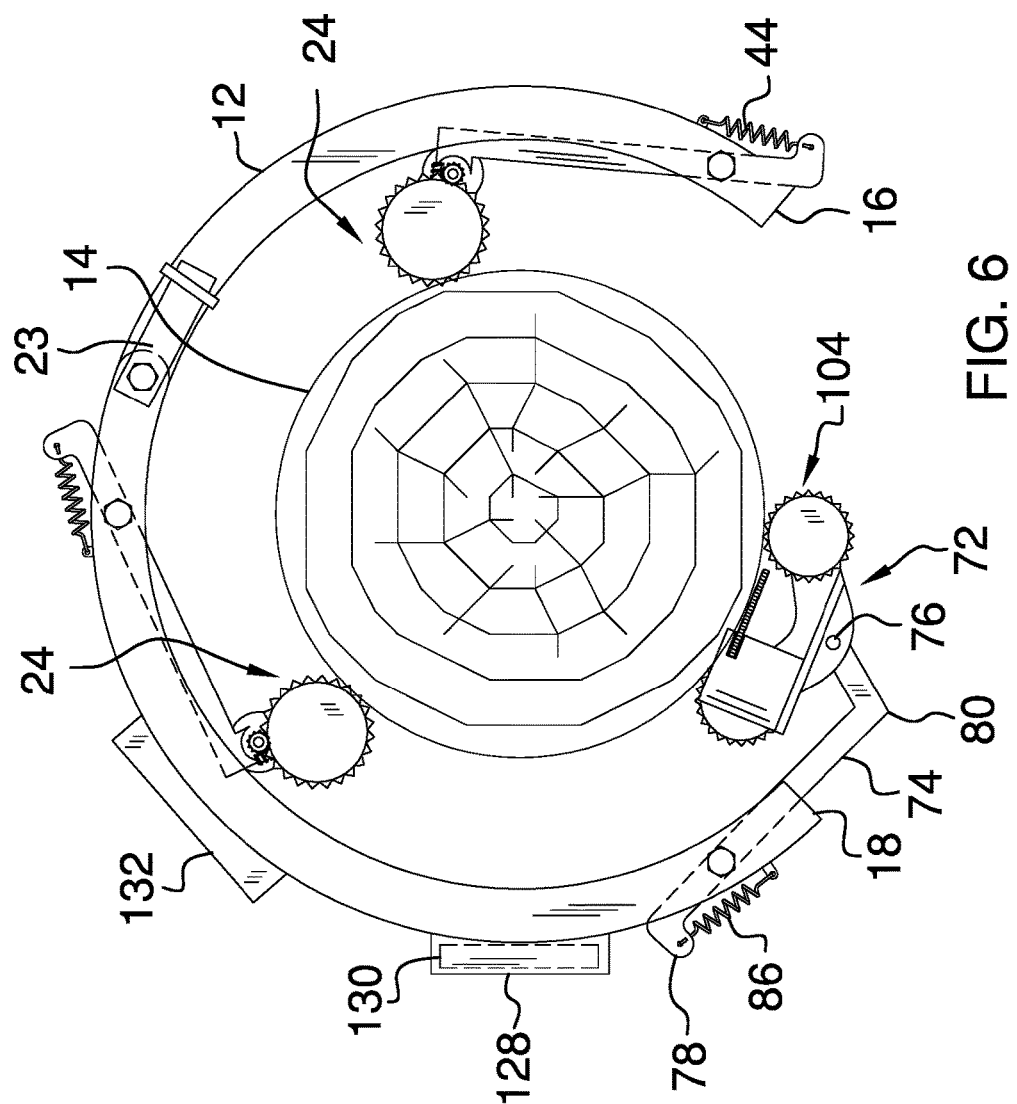
FIG. 6 is a perspective in-use view of an embodiment of the disclosure.
Figure 7:
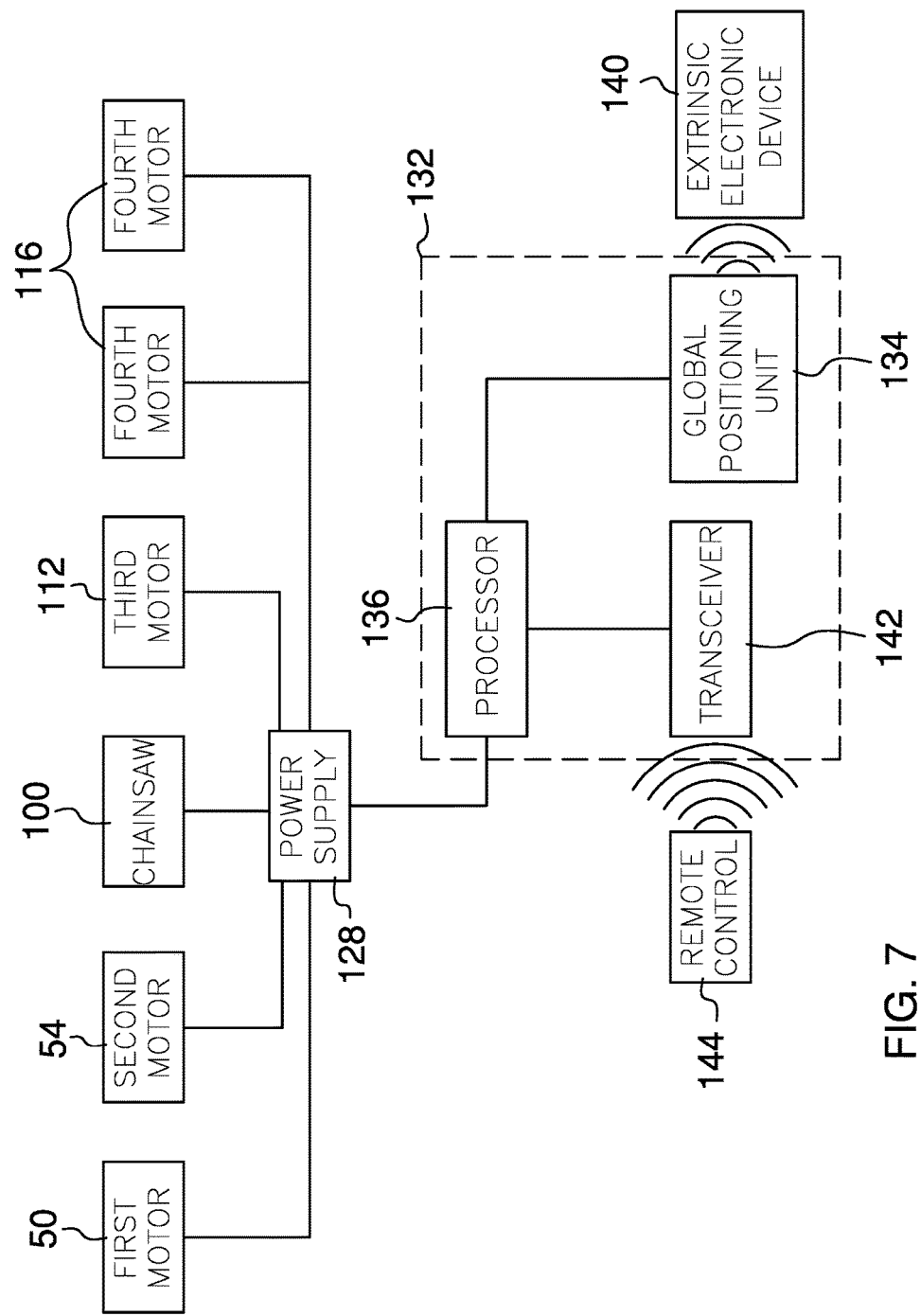
FIG. 7 is a schematic view of an embodiment of the disclosure.

With reference now to the drawings, and in particular to FIGS. 1 through 7 thereof, a new cutting device embodying the principles and concepts of an embodiment of the disclosure and generally designated by the reference numeral 10 will be described.

As best illustrated in FIGS. 1 through 7, the automated tree cutting assembly 10 generally comprises a collar 12 that may be positioned around a tree 14. The collar 12 has a first end 16 and a second end 18. The collar 12 is arcuate between the first end 16 and the second end 18 to substantially define a circle. The collar 12 includes a first half 20 that is hingedly coupled to a second half 22. Thus, the collar 12 is positionable between a closed position and an open position.

The collar 12 facilitates the tree 14 to be centrally positioned in the collar 12 when the collar 12 is in the open position. The collar 12 substantially surrounds the tree 14 when the collar 12 is in the closed position. A lock 23 is provided and the lock 23 is removably coupled to the collar 14. The lock 23 is positioned at an intersection of the first half 20 and the second half 22. The lock 23 selectively retains the collar 12 in the closed position.

A plurality of climbing units 24 is provided and each of the climbing units 24 is movably coupled to the collar 12. Each of the climbing units 24 frictionally engages the tree 14 thereby facilitating each of the climbing units 24 to urge the collar 12 around and up the tree 14. Each of the climbing units 24 is positioned inside of the collar 12 such that each of the climbing units 24 is positionable a selected distance from a focus of the collar 12. Thus, each of the climbing units 24 accommodates a variety of tree 14 diameters. The climbing units 24 are spaced apart from each other and distributed around the collar 12.

Each of the climbing unit 24 comprises a swing arm 26 that has a primary end 28, a secondary end 30, a top side 32 and a bottom side 34. The swing arm 26 is hingedly coupled to the collar 12 at a point that is closer to the secondary end 30 than the primary end 28. The swing arm 26 has a bend 36 thereon to define a first portion 38 and a second portion 40 of the swing arm 26. The first portion 38 forms an angle with respect to the second portion 40.

The bend 36 is positioned closer to the primary end 28 than the secondary end 30 and the primary end 28 is positioned on the first portion 38. The swing arm 26 extends inwardly toward the focus of the collar 12 having the primary end 28 being positioned proximate the focus. The primary end 28 curves outwardly between the top side 32 and the bottom side 34. The primary end 28 has a plurality of teeth 42. The teeth 42 are spaced apart from each other and are distributed between the top side 32 and the bottom side 34.

A first biasing member 44 is coupled between the secondary end 30 of the swing arm 26 and the collar 12. The first biasing member 44 biases the primary end 28 toward the focus of the collar 12. The first biasing 44 member may comprise a spring or the like.

Each of the climbing units 24 includes a first drive 46. The first drive 46 is hingedly coupled to a corresponding climbing unit 24 and the first drive 46 frictionally engages an exterior 48 of the tree 14. Thus, the first drive 46 selectively urges the collar 12 to travel around a diameter of the tree. The first drive 46 is positionable at a selected angle with respect to the corresponding climbing unit 24. The first drive 46 selectively urges the collar 12 to travel around the tree 14 in a spiral. Thus, the collar 12 may climb upwardly and downwardly along a length of the tree 14.

The first drive 46 comprises a first motor 50. The first motor 50 is movably coupled to the swing arm 26. The first motor 50 is positioned adjacent to the primary end 28 of the swing arm 26. The first motor 50 may comprise an electric motor or the like.

A first worm gear 52 is rotatably coupled to the first motor 50 and the first motor 50 rotates the first worm gear 52. The first motor 50 is positioned such that the first worm gear 52 is oriented transversely with respect to the swing arm 26.

The first worm gear 52 engages the teeth 42 on the primary end 28 of the swing arm 26. Thus, the first drive 46 is selectively tilted about a longitudinal axis extending through the first portion 38 of the swing arm 26.

A second motor 54 is coupled to the first motor 50. A shaft 56 is rotatably coupled to the second motor 54 such that the second motor 54 rotates the shaft 56. The shaft 56 has a distal end 58 with respect to the second motor 54. The second motor 54 may comprise an electric motor or the like.

A first roller 60 has an upper end 62, a lower end 64 and an outer surface 66 extending between the upper end 62 and the lower end 64. The lower end 64 is coupled to the distal end 58 of the shaft 56. Thus, the second motor 54 rotates the first roller 60 when the second motor 54 is turned on. The outer surface 66 comprises a plurality of teeth 68 to frictionally engage the exterior 48 of the tree 14. A longitudinal axis extends through the upper end 62 and the lower end 64. The first motor 50 selectively positions the first roller 60 at a selected orientation. Thus, the longitudinal axis in the first roller 60 is positionable at a selected angle of lateral deflection with respect to the longitudinal axis corresponding to the swing arm 26.

A cutting unit 72 is movably coupled to the collar 12. The cutting unit 72 cuts branches from the tree 14 when the collar 12 is positioned around the tree 14. Thus, cutting unit 72 prepares the tree 14 to be logged. The cutting unit 72 comprises a control arm 74 that has a leading end 76 and a following end 78. The control arm 74 is hingedly coupled to the collar 12 at a point that is closer to the following end 78 than the leading end 76.

The control arm 74 has a bend 80 thereon to define a first portion 82 and a second portion 84 of the control arm 74. The first portion 82 of the control arm 74 forms an angle with respect to the second portion 84 of the control arm 74. The bend 80 on the control arm 74 is positioned closer to the leading end 76 than the following end 78. The leading end 76 is positioned on the first portion 82 of the control arm 74. The control arm 74 extends inwardly toward a focus of the collar 12 having the leading end 76 positioned proximate the focus.

A second biasing 86 member is provided. The second biasing member 86 is coupled between the following end 78 and the collar 12. The second biasing member 86 biases the leading end 76 toward the focus. The second biasing member 86 may comprise a spring or the like.

A wheel 88 is provided that has a first face 90, a second face 92 and an outer edge 94 extending between the first face 90 and the second face 92. The first face 90 is coupled to the leading end 76 of the control arm 74. The outer edge 94 comprises a plurality of teeth 96. The teeth 96 on the wheel 88 are spaced apart from each other and distributed along a bottom side 98 of the outer edge 94.

A chainsaw 100 is movably coupled to the cutting unit 72. The chain saw 100 cuts the branches from the tree 14 when the collar 12 is positioned around the tree 14. The chainsaw 100 may comprise an electric chainsaw or the like. The chainsaw 100 includes a chain saw drive 102. The chain saw drive 102 selectively urges the chainsaw 100 upwardly and downwardly with respect to the collar 12.

A second drive 104 is rotatably coupled to the second face 92 of the wheel 88. The second drive 104 frictionally engages the exterior 48 of the tree 14. Thus, the second drive 104 selectively urges the collar 12 to travel around a diameter of the tree 14. The second drive 104 is positionable at a selected angle with respect to the control arm 74. The second drive 104 works in tandem with the first drive 46 to selectively urge the collar 12 to travel around the tree 14 in the spiral. Thus, the collar 12 may climb upwardly and downwardly along the tree 14.

The second drive 104 comprises a mount 106 that is rotatably coupled to the second face 92 of the wheel 88. The mount 106 includes a pair of arms 108. Each of the arms 108 extends away from an intersection of the wheel 88 and the mount 106. Each of the arms 108 has a distal end 110 with respect to the intersection. The distal end 110 corresponding to each of the arms 108 is spaced apart from each other.

A third motor 112 is coupled to the mount 106. The third motor 112 may comprise an electric motor or the like. A second worm gear 114 is rotatably coupled to the third motor 112 and the third motor 112 selectively rotates the second worm gear 114. The second worm gear 114 engages the teeth 96 on the wheel 88. Thus, the second drive 104 is selectively tilted about a longitudinal axis extending through the first portion 82 of the control arm 74.

A pair of fourth motors 116 is provided. Each of the fourth motors 116 is coupled to an associated one of the arms 108. Each of the fourth motors 116 is positioned on the distal end 110 corresponding to the associated arm 108. Each of the fourth motors 116 may comprise an electric motor or the like.

A pair of second rollers 118 is provided. Each of the second rollers 118 has a topmost end 120, a bottommost end 122 and an exterior surface 124 extending between the topmost end 120 and the bottommost end 122. The bottommost end 122 corresponding to each of the second rollers 118 is rotatably coupled to an associated one of the fourth motors 116. The exterior surface 124 comprises a plurality of teeth 126 to frictionally engage the exterior 48 of the tree 14. The third motor 112 selectively positions each of the second rollers 118 at a selected orientation. Thus, a longitudinal axis extending through the topmost end 120 and the bottommost end 122 is positionable at a selected angle of lateral deflection with respect to the longitudinal axis corresponding to the control arm 74.

A power supply 128 is coupled to the collar 12. The power supply 128 is electrically coupled to the first motor 50, the second motor 54, the chainsaw 100, the third motor 112 and each of the fourth motors 116. The power supply 128 comprises at least one battery 130. The battery 130 may comprise a rechargeable, deep cycle battery or the like.

A data collection unit 132 is provided and the data collection unit 132 is coupled to the collar 12. The data collection unit 132 includes a global positioning system 134. The global positioning system 134 is in electrical communication with a gps satellite. The global positioning system 134 detects a distance the collar 12 travels along the tree 14.

The data collection unit 132 further includes a processor 136 and the processor 136 is electrically coupled to the global positioning system 134. The processor 136 is electrically coupled to the power supply 128. The processor 136 receives data from the global positioning system 134. Thus, the processor 136 determines a distance the collar 12 travels along the tree 14 to include diameter of the tree 14 and length of the tree 14. The processor 136 calculates potential lumber yield from the tree 14 based upon the data from the global positioning system 134.

The data collection unit 132 may be placed in electrical communication with an extrinsic electronic device 140 through any conventional electronic means. The extrinsic electronic device 140 may be a personal computer or the like. The potential lumber yield may be analyzed on the extrinsic electronic device 140. The data collection unit 132 may include a transceiver 142 and the transceiver 142 may be electrically coupled to the processor 136.

A remote control 144 may be provided and the remote control 144 may be manipulated. The remote control 144 may be in electrical communication with the transceiver 142 through any conventional electronic means. The remote control 144 controls operational parameters of each of the climbing units 24 and the cutting unit 72. Thus, the collar 12 may be remotely steered around the tree 14, upwardly along the tree 14 and downwardly along the tree 14. Additionally, the chainsaw 100 may be remotely manipulated.

In use, the collar 12 is positioned in the open position and the collar 12 is positioned around the tree 14. The collar 12 is positioned in the closed position to surround the tree 14. The first roller 60 corresponding to each of the climbing units 24 frictionally engages the tree 14. Each of the second rollers 118 frictionally engages the tree 14. The remote control 144 is manipulated to urge the collar 12 along the tree 14. The chainsaw 100 is selectively aligned with branches on the tree 14 and the chainsaw 100 cuts the branches from the tree 14. The collar 12 is urged upwardly along the tree 14 until all branches have been cut from the tree 14. Thus, the tree 14 is prepared to be felled for logging purposes. The collar 12 is removed from the tree 14 when all of the branches are removed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automated tree cutting assembly comprising:
   a collar being configured to be positioned around a tree;
   a plurality of climbing units, each of said climbing units being movably coupled to said collar wherein said climbing units are configured to frictionally engage the tree thereby facilitating each of said climbing units to urge said collar around and up the tree, each of said climbing units being positioned inside of said collar such that each of said climbing units is positionable a selected distance from a center of said collar wherein each of said climbing units is configured to accommodate a variety of tree diameters, each of said climbing units being positionable at selected angle with respect to said collar wherein each of said climbing unit units is configured to urge said collar to travel in a spiral along the tree thereby facilitating said collar to climb upwardly and downwardly along the tree,
   wherein each of said climbing units comprises
   a swing arm having a primary end, a secondary end, a top side and a bottom side, said swing arm being hingedly coupled to said collar at a point being closer to said secondary end than said primary end, said swing arm having a bend thereon to define a first portion and a second portion of said swing arm, said first portion forming an angle with respect to said second portion, said bend being positioned closer to said primary end than said secondary end, said primary end being positioned on said first portion,
   said swing arm extends inwardly toward a center of said collar having said primary end being positioned proximate said center, said primary end curving outwardly between said top side and said bottom side, said primary end having a plurality of teeth, said plurality of teeth being spaced apart from each other and being distributed between said top side and said bottom side, and
   a first biasing member being coupled between said secondary end of said swing arm and said collar such that said first biasing member biases said primary end toward said center; and
   a cutting unit being movably coupled to said collar wherein said cutting unit is configured to cut branches from the tree when said collar is positioned around the tree thereby facilitating the tree to be logged.

2. The assembly according to claim 1, wherein said collar has a first end and a second end, said collar being arcuate between said first end and said second end to substantially define a circle, said collar including a first half being hingedly coupled to a second half such that said collar is positionable between a closed position and an open position, said collar being configured to facilitate the tree to be centrally positioned in said collar when said collar is in said open position, said collar being configured to substantially surround the tree when said collar is in said closed position.

3. The assembly according to claim 1, further comprising a first drive being hingedly coupled to said primary end of said swing arm wherein said first drive is configured to frictionally engage an exterior of the tree thereby facilitating said first drive to selectively urge said collar to travel around a diameter of the tree, said first drive being positionable at a selected angle with respect to said swing arm wherein said first drive is configured to selectively urge said collar to travel around the tree in the spiral thereby facilitating said collar to climb upwardly and downwardly along a length of the tree.

4. The assembly according to claim 3, wherein said first drive comprises:
   a first motor being movably coupled to said swing arm, said first motor being positioned adjacent to said primary end of said swing arm; and
   a first worm gear being rotatably coupled to said first motor such that said first motor rotates said first worm gear, said first motor being positioned such that said first worm gear is oriented transversely with respect to said swing arm, said first worm gear engaging said teeth on said primary end such that said first drive is selectively tilted about a longitudinal axis extending through said first portion of said swing arm.

5. The assembly according to claim 4, wherein said first drive further comprises:
   a second motor being coupled to said first motor;
   a shaft being rotatably coupled to said second motor such that said second motor rotates said shaft, said shaft having a distal end with respect to said second motor; and
   a first roller having an upper end, a lower end and an outer surface extending between said upper end and said lower end, said lower end being coupled to said distal end of said shaft such that said second motor rotates said first roller when said second motor is turned on, said outer surface comprising a plurality of teeth wherein said outer surface is configured to frictionally engage an exterior of the tree, said first motor selectively positioning said first roller at a selected orientation such that a longitudinal axis extending through said upper end and said lower end is positionable at a selected angle of lateral deflection with respect to said longitudinal axis corresponding to said swing arm.

6. The assembly according to claim 1, wherein said cutting unit comprises: a control arm having a leading end and a following end, said control arm being hingedly coupled to said collar at a point being closer to said following end than said leading end, said control arm having a bend thereon to define a first portion and a second portion of said control arm, said first portion of said control arm forming an angle with respect to said second portion of said control arm, said bend on said control arm being positioned closer to said leading end than said following end, said leading end being positioned on said first portion of said control arm, said control arm extending inwardly toward a center of said collar having said leading end being positioned proximate said center; and a second biasing member being coupled between said following end and said collar such that said second biasing member biases said leading end toward said center.

7. An automated tree cutting assembly comprising:
a collar being configured to be positioned around a tree;
a plurality of climbing units, each of said climbing units being movably coupled to said collar wherein said climbing units are configured to frictionally engage the tree thereby facilitating each of said climbing units to urge said collar around and up the tree, each of said climbing units being positioned inside of said collar such that each of said climbing units is positionable a selected distance from a center of said collar wherein each of said climbing units is configured to accommodate a variety of tree diameters, each of said climbing units being positionable at selected angle with respect to said collar wherein each of said climbing unit units is configured to urge said collar to travel in a spiral along the tree thereby facilitating said collar to climb upwardly and downwardly along the tree;
a cutting unit being movably coupled to said collar wherein said cutting unit is configured to cut branches from the tree when said collar is positioned around the tree thereby facilitating the tree to be logged, wherein said cutting unit comprises
a control arm having a leading end and a following end, said control arm being hingedly coupled to said collar at a point being closer to said following end than said leading end, said control arm having a bend thereon to define a first portion and a second portion of said control arm, said first portion of said control arm forming an angle with respect to said second portion of said control arm, said bend on said control arm being positioned closer to said leading end than said following end, said leading end being positioned on said first portion of said control arm, said control arm extending inwardly toward a center of said collar having said leading end being positioned proximate said center, and
a second biasing member being coupled between said following end and said collar such that said second biasing member biases said leading end toward said center; a wheel having a first face, a second face and an outer edge extending between said first face and said second face, said first face being coupled to said leading end of said control arm, said outer edge comprising a plurality of teeth, said teeth on said wheel being spaced apart from each other and distributed along a bottom side of said outer edge, and
a chainsaw being movably coupled to said cutting unit wherein said chain saw is configured to cut the branches from the tree when said collar is positioned around the tree.

8. The assembly according to claim 7, further comprising a second drive being rotatably coupled to said to said second face of said wheel wherein said second drive is configured to frictionally engage an exterior of the tree thereby facilitating said second drive to selectively urge said collar to travel around a diameter of the tree, said second drive being positionable at a selected angle with respect to said control arm wherein said second drive is configured to selectively urge said collar to travel around the tree in the spiral thereby facilitating said collar to climb upwardly and downwardly along the tree.

9. The assembly according to claim 8, wherein said second drive comprises a mount being rotatably coupled to said second face of said wheel, said mount including a pair of arms, each of said arms extending away from an intersection of said wheel and said mount, each of said arms having a distal end with respect to said intersection.

10. The assembly according to claim 9, wherein said second drive further comprises:
a third motor being coupled to said mount; and
a second worm gear being rotatably coupled to said third motor such that said third motor selectively rotates said second worm gear, said second worm gear engaging said teeth on said wheel such that said such that said second drive is selectively tilted about a longitudinal axis extending through said first portion of said control arm.

11. The assembly according to claim 10, wherein said second drive further comprises:
a pair of fourth motors, each of said fourth motors being coupled to an associated one of said arms, each of said fourth motors being positioned on said distal end corresponding to said associated arm, and
a pair of second rollers, each of said second rollers having a topmost end, a bottommost end and an exterior surface extending between said topmost end and said bottommost end, said bottommost end corresponding to each of said second rollers being rotatably coupled to an associated one of said fourth motors, said exterior surface comprising a plurality of teeth wherein said exterior surface is configured to frictionally engage an exterior of the tree, said third motor selectively positioning each of said second rollers at a selected orientation such that a longitudinal axis extending through said topmost end and said bottommost end is positionable at a selected angle of lateral deflection with respect to said longitudinal axis corresponding to said control arm.

12. The assembly according to claim 1, further comprising:
a first motor;
a second motor;
a chainsaw;
a plurality of third motors;
a pair of fourth motors; and a power supply being coupled to said collar, said power supply being electrically coupled to said first motor, said second motor, said chainsaw, each of said third motors and each of said fourth motors, said power supply comprising at least one battery.

13. An automated tree cutting assembly comprising:

a collar being configured to be positioned around a tree, said collar having a first end and a second end, said collar being arcuate between said first end and said second end to substantially define a circle, said collar including a first half being hingedly coupled to a second half such that said collar is positionable between a closed position and an open position, said collar being configured to facilitate the tree to be centrally positioned in said collar when said collar is in said open position, said collar being configured to substantially surround the tree when said collar is in said closed position;

a plurality of climbing units, each of said climbing units being movably coupled to said collar wherein said climbing units are configured to frictionally engage the tree thereby facilitating each of said climbing units to urge said collar around and up the tree, each of said climbing units being hingedly positioned inside of said collar such that each of said climbing units is positionable a selected distance from a center of said collar wherein each of said climbing units is configured to accommodate a variety of tree diameters, each of said climbing units comprising:

a swing arm having a primary end, a secondary end, a top side and a bottom side, said swing arm being hingedly coupled to said collar at a point being closer to said secondary end than said primary end, said swing arm having a bend thereon to define a first portion and a second portion of said swing arm, said first portion forming an angle with respect to said second portion, said bend being positioned closer to said primary end than said secondary end, said primary end being positioned on said first portion, said swing arm extending inwardly toward a center of said collar having said primary end being positioned proximate said center, said primary end curving outwardly between said top side and said bottom side, said primary end having a plurality of teeth, said plurality of teeth being spaced apart from each other and being distributed between said top side and said bottom side, a first biasing member being coupled between said secondary end of said swing arm and said collar such that said first biasing member biases said primary end toward said center, and a first drive being hingedly coupled to said climbing unit wherein said first drive is configured to frictionally engage an exterior of the tree thereby facilitating said first drive to selectively urge said collar to travel around a diameter of the tree, said first drive being positionable at a selected angle with respect to said climbing unit wherein said first drive is configured to selectively urge said collar to travel around the tree in a spiral thereby facilitating said collar to be climb upwardly and downwardly along a length of the tree, said first drive comprising:

a first motor being movably coupled to said swing arm, said first motor being positioned adjacent to said primary end of said swing arm, a first worm gear being rotatably coupled to said first motor such that said first motor rotates said first worm gear, said first motor being positioned such that said first worm gear is oriented transversely with respect to said swing arm, said first worm gear engaging said teeth on said primary end such that said first drive is selectively tilted about a longitudinal axis extending through said first portion of said swing arm, a second motor being coupled to said first motor, a shaft being rotatably coupled to said first motor such that said second motor rotates said shaft, said shaft having a distal end with respect to said second motor, and a first roller having an upper end, a lower end and an outer surface extending between said upper end and said lower end, said lower end being coupled to said distal end of said shaft such that said second motor rotates said first roller when said second motor is turned on, said outer surface comprising a plurality of teeth wherein said outer surface is configured to frictionally engage an exterior of the tree, said first motor selectively positioning said first roller at a selected orientation such that a longitudinal axis extending through said upper end and said lower end is positionable at a selected angle of lateral deflection with respect to said longitudinal axis corresponding to said swing arm;

a cutting unit being movably coupled to said collar wherein said cutting unit is configured to cut branches from the tree when said collar is positioned around the tree thereby facilitating the tree to be logged, said cutting unit comprising:

a control arm having a leading end and a following end, said control arm being hingedly coupled to said collar at a point being closer to said following end than said leading end, said control arm having a bend thereon to define a first portion and a second portion of said control arm, said first portion of said control arm forming an angle with respect to said second portion of said control arm, said bend on said control arm being positioned closer to said leading end than said following end, said leading end being positioned on said first portion of said control arm, said control arm extending inwardly toward a center of said collar having said leading end being positioned proximate said center, a second biasing member being coupled between said following end and said collar such that said second biasing member biases said leading end toward said center, a wheel having a first face, a second face and an outer edge extending between said first face and said second face, said first face being coupled to said leading end of said control arm, said outer edge comprising a plurality of teeth, said teeth on said wheel being spaced apart from each other and distributed along a bottom side of said outer edge, and a chainsaw being movably coupled to said cutting unit wherein said chain saw is configured to cut the branches from the tree when said collar is positioned around the tree, and a second drive being rotatably coupled to said to said second face of said wheel wherein said second drive is configured to frictionally engage an exterior of the tree thereby facilitating said second drive to selectively urge said collar to travel around a diameter of the tree, said second drive being positionable at a selected angle with respect to said control arm wherein said second drive is configured to selectively urge said collar to travel around the tree in a spiral thereby facilitating said collar to climb upwardly and downwardly along the tree, said second drive comprising:

a mount being rotatably coupled to said second face of said wheel, said mount including a pair of arms, each of said arms extending away from an intersection of said wheel and said mount, each of said arms having a distal end with respect to said intersection, a third motor being coupled to said mount, a second worm gear being rotatably coupled to said third motor such that said third motor selectively rotates said second worm gear, said second worm gear engaging said teeth on said wheel such that said such that said second drive is selectively tilted about a longitudinal axis extending through said first portion of said control arm, a pair of fourth motors, each of said fourth motors being coupled to an associated one of said arms, each of said fourth motors being positioned on said distal end corresponding to said associated arm, and a pair of second rollers, each of said second rollers having a topmost end, a bottommost end and an exterior surface extending between said topmost end and said bottommost end, said bottommost end corresponding to each of said second rollers being rotatably coupled to an associated one of said fourth motors, said exterior surface comprising a plurality of teeth wherein said exterior surface is configured to frictionally engage an exterior of the tree, said third motor selectively positioning each of said second rollers at a selected orientation such that a longitudinal axis extending through said topmost end and said bottommost end is positionable at a selected angle of lateral deflection with respect to said longitudinal axis corresponding to said control arm; and a power supply being coupled to said collar, said power supply being electrically coupled to said first motor, said second motor, said chainsaw, each of said third motors and each of said fourth motors, said power supply comprising at least one battery.

* * * * *